United States Patent [19]

Matsunaga et al.

[11] Patent Number: 4,613,900
[45] Date of Patent: Sep. 23, 1986

[54] DIGITAL CODE READING APPARATUS AND METHOD

[75] Inventors: Osamu Matsunaga; Hiroyuki Kobayashi, both of Tokyo, Japan

[73] Assignee: Sony Corporation, Tokyo, Japan

[21] Appl. No.: 563,163

[22] Filed: Dec. 19, 1983

[30] Foreign Application Priority Data

Dec. 20, 1982 [JP] Japan ................... 57-223211

[51] Int. Cl.[4] .............. H04N 7/167; H03K 5/153
[52] U.S. Cl. .................................. 358/123; 358/123; 307/358
[58] Field of Search ............... 358/122, 123; 307/358, 307/359; 328/119, 164

[56] References Cited

U.S. PATENT DOCUMENTS

| 3,942,038 | 3/1976 | Hutch | 307/358 |
| 4,225,884 | 9/1980 | Block et al. | 358/122 |
| 4,338,628 | 7/1982 | Payne et al. | 358/122 |
| 4,354,201 | 10/1982 | Sechet et al. | |
| 4,358,738 | 11/1982 | Kahn | 307/358 |
| 4,396,946 | 8/1983 | Bond | 358/122 |
| 4,463,272 | 7/1984 | Tucker | 307/358 |
| 4,468,625 | 8/1984 | Tandart et al. | 307/358 |
| 4,509,180 | 4/1985 | Neyer | 307/358 |
| 4,520,280 | 5/1985 | Yoshikawa et al. | 307/358 |

FOREIGN PATENT DOCUMENTS

| 1155858 | 6/1969 | United Kingdom . |
| 2063627 | 6/1981 | United Kingdom . |
| 2072981 | 10/1981 | United Kingdom . |
| 2085685 | 4/1982 | United Kingdom . |
| 2118005 | 10/1983 | United Kingdom . |
| 2048618 | 11/1983 | United Kingdom . |

Primary Examiner—S. C. Buczinski
Assistant Examiner—Melissa Koltak
Attorney, Agent, or Firm—Lewis H. Eslinger; Alvin Sinderbrand; Eslinger & Pelton

[57] ABSTRACT

A digital code reader reads the digital key code in a scrambled video signal. The key code represents the scheme used to scramble the signal before broadcasting and is used by the video receiver to unscramble the received signal. To prevent misreading of the key code due to interference such as ghost signals, the reader uses a predetermined property established for the broadcast signal. The change in that property caused by interference in the received signal is determined and a control signal is generated from that determination. A threshold signal is used to reproduce the key code from the received signal by comparison of the levels of the received signal with the level of the threshold signal. The level of the threshold signal is set by the control signal, which depends on the change detected in the predetermined property of the broadcast signal. Thus the level of the threshold signal can be set to enable the reproduced digital information to match the broadcast digital information.

8 Claims, 13 Drawing Figures

PRIOR ART

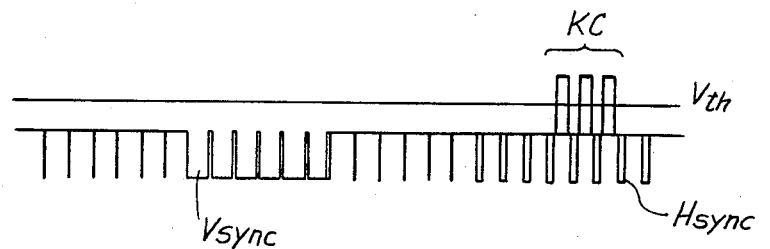
FIG.7A
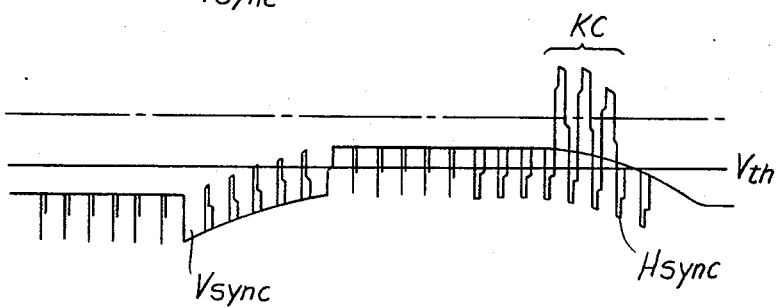
FIG.7B
FIG.8
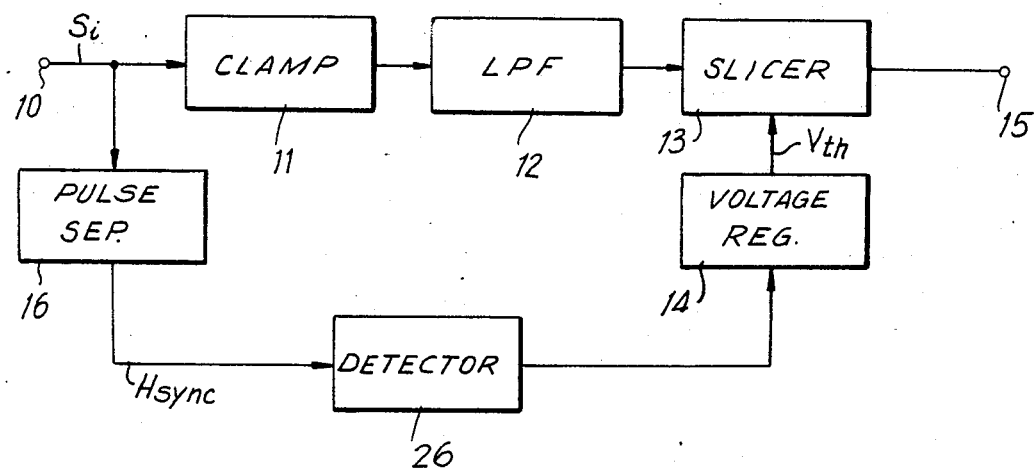

DIGITAL CODE READING APPARATUS AND METHOD

BACKGROUND OF THE INVENTION

1. Field of the Invention

The present invention relates to a digital information reading method and apparatus and, more particularly, to a method and apparatus for correctly reading a digital code in a signal received with interference.

2. Description of the Prior Art

In certain television broadcasting techniques, such as "Pay-TV" systems, the video signal is scrambled in a predetermined manner before it is broadcast. For example, the phase of a particular portion of the signal can be inverted at a predetermined point in every horizontal interval. Provided the exact scheme of scrambling is known, the signal can be unscrambled at the receiver and converted into the original video signal. Because the scrambled video signal is useless without knowing the exact scrambling scheme and without having an unscrambling device, it has been possible to avoid unauthorized use of the transmitted signal by persons who are not subscribers to the Pay-TV system.

The required information for decoding the scrambled signal is commonly contained in a digital key code broadcast as part of the video signal. The television receiver reads the key code and unscrambles the video signal accordingly. However, interference can cause level changes in the signal and effectively mask the key code, the identity of which is of course required to unscramble the signal. A particularly pervasive problem preventing proper reading of such key codes is the type of video interference called "ghosts".

SUMMARY OF THE INVENTION

It is an object of the invention to overcome those shortcomings of the prior art.

It is another object of the invention to enable the correct reading of digital information in a signal received with interference masking the information.

It is a further object of the present invention to provide a method for reading a digital key code in a scrambled video signal.

It is a further object of the present invention to provide apparatus for reading the digital key code broadcast with a scrambled video signal.

According to an aspect of the present invention, a digital code is read by reproducing digital information from a received signal that was broadcast with at least two levels defining broadcast digital information and received with an interference signal which changes a predetermined property of the broadcast signal and causes the levels of the received signal to change according to the change in the predetermined property thereby masking the broadcast digital information. The change in the predetermined property of the broadcast signal due to the interference is determined and a control signal is generated in response to that determination. A threshold signal is generated for reading the digital information in the received signal by comparing the levels of the received signal to the level of the threshold signal. The level of the threshold signal is set in response to the control signal so that the reproduced digital information matches the broadcast digital information.

Those and other objects, features and advantages of the present invention will become apparent when considering the drawings and the following detailed description of the invention.

BRIEF DESCRIPTION OF THE DRAWINGS

FIGS. 7A and 7B depict, respectively, the waveform of a vertical blanking interval of a video signal without interference and the waveform of a similar video signal altered by a ghost signal.

FIG. 8 schematically illustrates apparatus according to the invention for correctly reading a digital key code in the video signal shown in FIG. 7B.

DETAILED DESCRIPTION OF PREFERRED EMBODIMENTS

The present invention will be better understood by first considering in more detail the problems encountered in the prior art.

Figure 1:
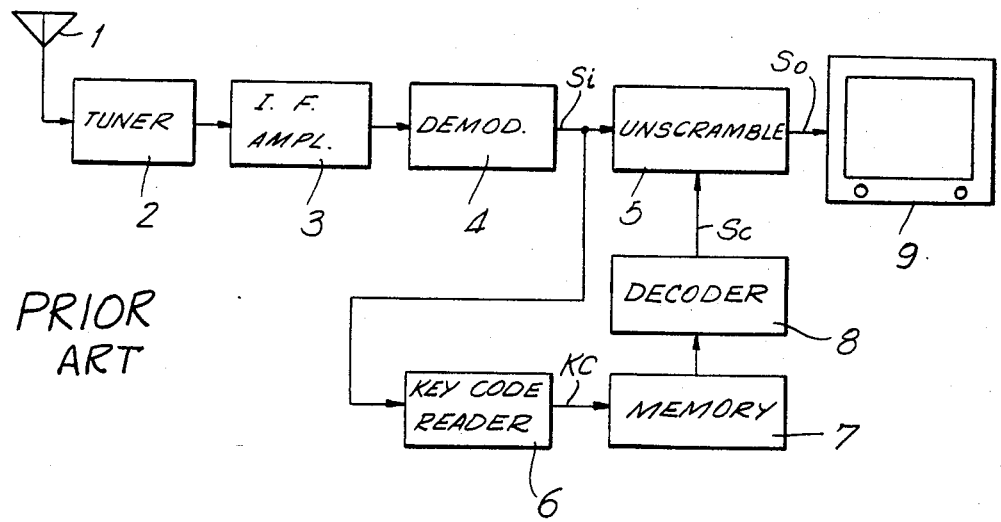
FIG. 1 schematically illustrates a prior art television receiver for unscrambling a scrambled video signal.

The prior art television receiver shown in FIG. 1 comprises an antenna 1 that receives a scrambled video signal. The received signal is fed to a tuner 2, the output of which leads to a video intermediate-frequency (IF) amplifier 3. A demodulator 4 accepts the output of the IF amplifier 3 and the demodulated, scrambled video signal $S_i$ is then unscrambled in an unscrambler 5.

To unscramble the demodulated video signal $S_i$, it is also fed to a key code reader 6. The key code reader 6 reads the key code broadcast with the scrambled signal and supplies a key code signal KC. A memory 7 stores the key code signal KC and, at the proper time, supplies the key code signal KC to a decoder 8 which generates a decoding signal $S_c$ used by the unscrambler to provide the unscrambled video signal $S_o$. The unscrambled signal $S_o$ is used by a video monitor 9 to display a televison picture. The exact nature of the decoding signal $S_c$ of course depends on the value of the key code. Thus, if the key code is incorrectly read, the video signal will not be properly unscrambled.

Figure 2A:
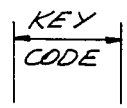
FIGS. 2A-2C depict waveforms of video signals incorporating digital key codes for unscrambling the video signal, with FIG. 2A showing such a video signal without interference and FIGS. 2B and 2C showing video signals with ghost signals of positive- and negative-phase, respectively.
Figure 3A:
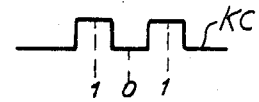
FIGS. 3A-3C graphically illustrate how the digital key code in the respective video signals shown in FIGS. 2A-2C are read incorrectly by prior art devices and correctly by the present invention.

FIGS. 2A and 3A illustrate how the key code reader 6 operates on a signal received with no interference. FIG. 2A shows a portion of the scrambled signal $S_i$. The pulse $H_{sync}$ is a horiztonal synchronizing pulse, and the following portion of the signal contains the digital key code.

The digital key code is read by using a threshold signal having a level $V_{th}$. Thus, when the level of the video signal is above $V_{th}$ at the signal interval in question, a digital "1" is read and when the level of the signal is below $V_{th}$, a digital "0" is read. The level $V_{th}$ is set at a particular level in relation to the signal's d.c. level or "clamp" level $V_{c1}$. As FIG. 3A illustrates, in the case where there is no interference in the signal, the key code is correctly read as 1,0,1 and the key code signal KC is provided accordingly.

Figure 2B:
Figure 3B:
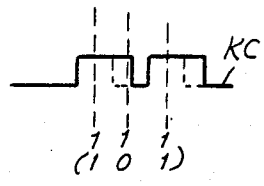

If the video signal is received with a ghost, however, the digital key code can be misread. FIG. 2B illustrates a signal received with a positive-phase ghost. (The term "positive-phase" is used herein according to convention, that is, the ghost has a positive phase when it has the same polarity as the portion of the main signal it echoes.) In the composite signal, comprising the video signal and the ghost signal, as shown in FIG. 2B, the pulse $H_{sync}$ is again a horizontal synchronizing pulse in the signal. The ghost signal depicted in FIG. 2B has the same width as the $H_{sync}$ pulse. If the portion $p_1$ of the signal immediately following the $H_{sync}$ pulse establishes the clamp level $V_{c1}$, then the level $V_{th}$ of the threshold signal will be as shown by the solid line in FIG. 2B. The video signal portion including the key code will have the waveform shown in FIG. 2B because of the ghost signal. Thus, at the detection points for the key code represented by the vertical dotted lines on FIG. 2B, the levels of the video signal are such that the key code signal KC is erroneously generated as 1,1,1 (illustrated in solid lines in FIG. 3B).

Figure 2C:
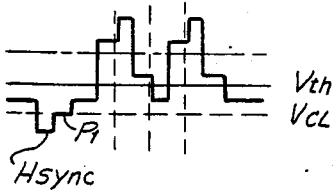
Figure 3C:
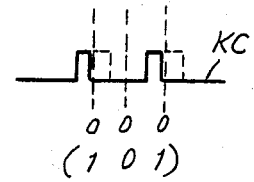

FIGS. 2C and 3C illustrate how the prior art apparatus can misread the key code if a negative-phase ghost is present in the received video signal. The ghost signal depicted in FIG. 2C has a width slightly less than the width of the $H_{sync}$ pulse. The portion $p_2$ defines the clamp level $V_{c1}$, so that the level $V_{th}$ of the threshold signal is as shown in FIG. 2C by a solid line. The solid lines in FIG. 3C illustrate the erroneously generated key code signal KC, which in this case will be read as 0,0,0 instead of the correct 1,0,1.

The present invention uses a predetermined property of the broadcast signal for adjusting the level of the threshold signal, which property changes because of interference in the received signal in a manner which is detectable at the receiver. More particularly, the detected change is used to adjust the level $V_{th}$ of the threshold signal to correctly reproduce the key code from the received signal.

Figure 4:
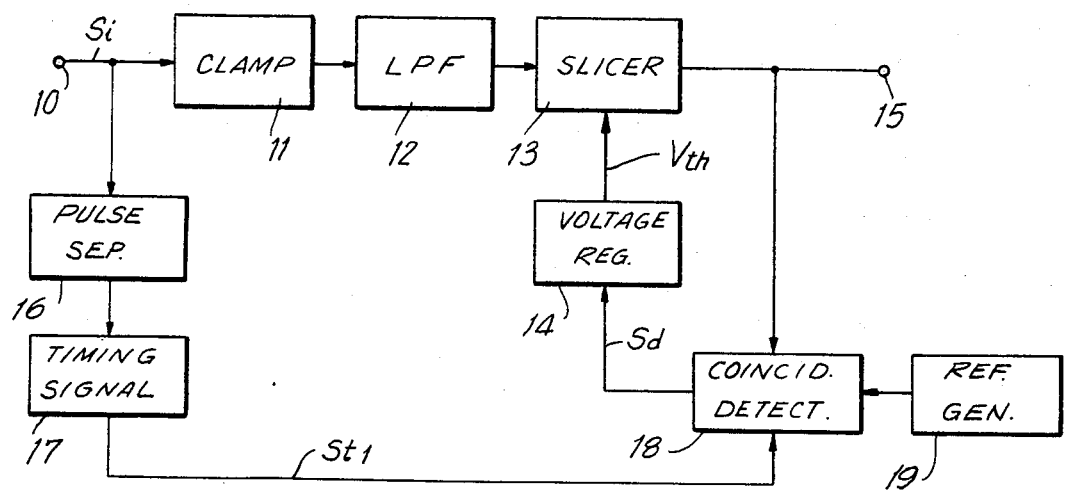
FIG. 4 schematically illustrates one embodiment of apparatus in accordance with the present invention for correctly reading the digital key code in a video signal.

Referring now to FIG. 4, it will be seen that in a first embodiment of a circuit apparatus in accordance with the present invention, the predetermined property of the broadcast video signal which changes because of interference comprises additional digital data which acts as a supplemental code for setting the voltage $V_{th}$ of the threshold signal. The supplemental code is included in a predetermined horizontal blanking interval of the broadcast signal at a predetermined time after the horizontal synchronizing pulse $H_{sync}$. If the broadcast value of the supplemental code and the predetermined horizontal blanking interval are known, then the proper level of the threshold signal for obtaining that supplemental code can be obtained. Then, assuming that the levels of the threshold signal for the supplemental code and for the key code are the same, then the broadcast key code can be reproduced at the receiver.

More particularly, in FIG. 4 the demodulated video signal $S_i$ is applied to an input terminal 10. A first circuit path includes a clamping circuit 11 which provides the d.c. level $V_{c1}$ of the signal. The signal then passes through a low-pass filter 12 to a slicer 13 which compares the level of the signal passing therethrough with the level of the threshold signal provided by a voltage regulator 14. The resulting digital signal from the slicer 13 is provided to an output terminal 15.

The video signal $S_i$ is also applied to a second circuit path which includes a pulse-separating circuit 16 for detecting horizontal and vertical synchronizing pulses in the signal $S_i$. A timing signal generating circuit 17 produces a timing signal $S_{t1}$ and supplies it to a coincidence detector 18. The timing signal $S_{t1}$ indicates the location in the signal $S_i$ of the supplemental code.

The coincidence detector 18 also receives a reference signal from a reference signal generator 19. The output of the slicer 13 is also supplied to the coincidence detector 18.

In the operation of the reading apparatus shown in FIG. 4, the level of the threshold signal provided by the voltage regulator 14 is varied so that the output of the slicer 13 is changed. The reference signal generator 19 supplies a digital signal known to be identical to the supplemental code provided in the broadcast signal. By using the timing signal $S_{t1}$, the coincidence detector 18 can compare the output of the slicer 13 at the particular portion of the video signal $S_i$ at which the supplemental code was added with the reference signal.

The varying threshold signal level enables the reader to detect the change in the supplemental code supplied with the broadcast signal and set the threshold signal at a level at which the received supplemental code matches the broadcast supplemental code. That is, when the output of the slicer 13 indicates that the level of the threshold signal provided by the voltage regulator 14 causes coincidence between the reference value for the supplemental code (which is known to be the value in the broadcast signal) and the value from the slicer 13, the coincidence detector 18 generates a detection signal $S_d$. When the voltage regulator 14 receives the detection signal, the level of the threshold signal is set. When that level is set for correctly detecting the supplemental code, then it is also set correctly for detecting the particular key code being used. The detection signal $S_d$ thus acts as a control signal which sets the level of the threshold signal so that the reproduced digital information matches the broadcast digital information.

The signal at the output terminal 15 comprises the entire video signal $S_i$. Thus, a sampling circuit (not shown) is used to read just the portion of the signal containing the key code (which is added at a known time after the $H_{sync}$ pulse) thereby to generate the key code signal KC.

The result of the operation of the circuit shown in FIG. 4 is graphically illustrated in FIGS. 2B, 2C, 3B and 3C. The dot-dash lines in those figures illustrate how the level $V_{th}$ of the threshold signal is changed to provide accurate key code data instead of the erroneous data provided by the prior art devices.

Figure 5:
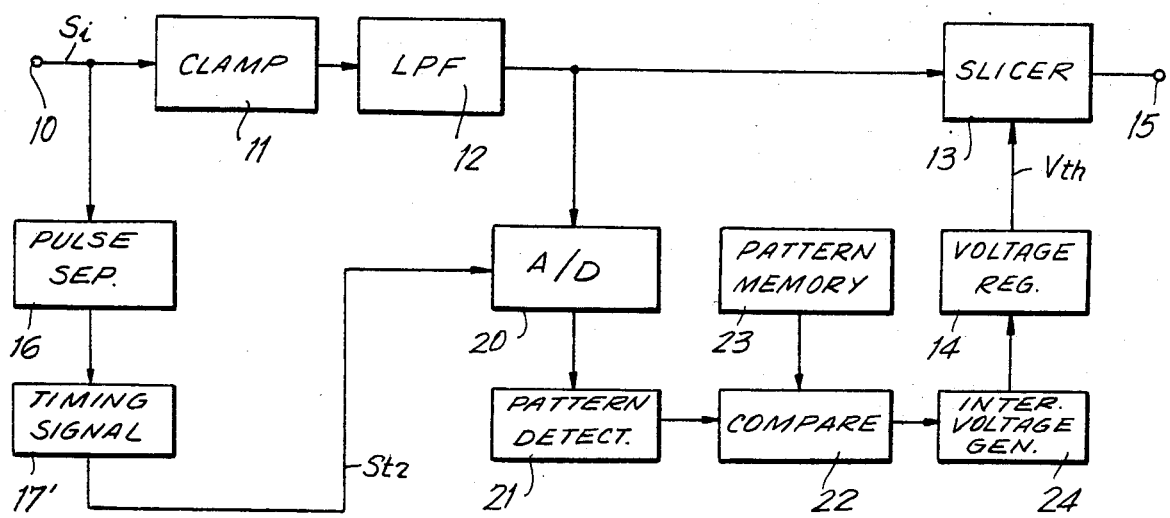
FIG. 5 schematically illustrates another embodiment of apparatus in accordance with the present invention.

FIG. 5 illustrates another embodiment of the present invention. Parts of the apparatus shown in FIG. 5 which correspond to parts of the apparatus in FIG. 4 are identified by similar reference numerals. Thus, the apparatus of FIG. 5 includes an input terminal 10 which receives the scrambled, demodulated video signal $S_i$. The clamp circuit 11 provides the d.c. level of the signal $S_i$ and thus the clamp level $V_{c1}$. The signal is then passed through the low-pass filter 12 and the slicer 13 to the output terminal 15.

The signal $S_i$ applied to terminal 10 is also provided to a second circuit path including the pulse-separating circuit 16. A timing signal generating circuit 17' provides a timing signal $S_{t2}$ which indicates the location in the video signal $S_i$ of a particular portion of the key code data. For this description, it will be assumed that the timing signal $S_{t2}$ indicates the location of the first digital "1" bit of the key code.

The second circuit path further includes an analog-to-digital converter (A/D) 20 to which is provided the signal from the low-pass filter 12. The timing signal $S_{t2}$ determines which portion of the signal provided from the filter 12 is converted to digital form. In the presently assumed case, that portion corresponds to the first digital "1" bit in the key code.

A pattern detector circuit 21 accepts the output of the A/D converter 20. The pattern detector 21 detects the variations in the level of the digital "1" bit provided by the A/D converter 20. In other words, the predetermined property of the broadcast signal for this embodiment comprises the waveform of a digital "1" bit of the key code. As FIGS. 2B and 2C illustrate, the change in the waveform pattern representing a digital "1" bit in the received key code depends on the nature of the ghost in the received signal. The resulting pattern signal is provided to a comparator 22 along with the contents of a pattern memory 23. The signal from the pattern detector 21 is compared with a plurality of reference signals from the pattern memory 23, each of which corresponds to a waveform pattern resulting from the known types of interference. The comparator 22 provides a control signal, the nature of which depends on the pattern from the memory 23 which coincided with the pattern of the waveform actually received. For example, the level of the control signal could vary according to which reference signal matched the received signal, or the control signal could be a digital signal.

The control signal from the comparator 22 is used by an intermediate voltage generator 24 to produce a signal which the voltage regulator 14 acts on to generate the threshold signal for the slicer 13. In this example, the level of the threshold signal is varied, as shown by the dot-dash lines in FIGS. 2B and 2C, depending on whether the comparison by the comparator 22 indicates the presence of a positive- or negative-phase ghost signal.

As in FIG. 4, the signal at the output terminal 15 in FIG. 5 must be further processed to provide the actual key code signal KC since the entire video signal $S_i$ appears at the terminal 15.

Figure 6:
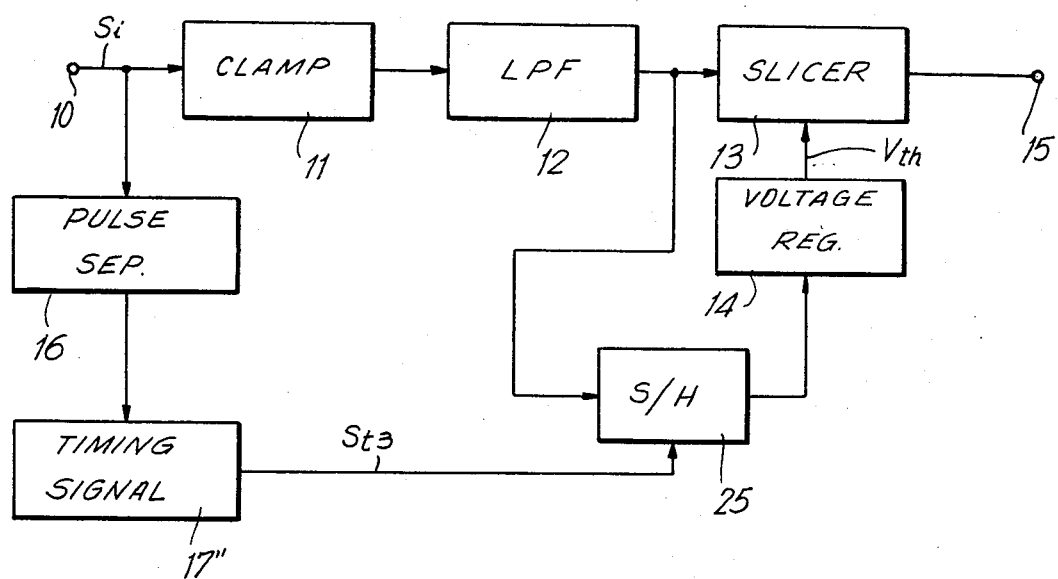
FIG. 6 schematically illustrates still another alternate embodiment of apparatus in accordance with the present invention.

FIG. 6 shows another embodiment of a digital code reading apparatus in accordance with the present invention. The first circuit path includes the input terminal 10, the clamping circuit 11, the low-pass filter 12 and the slicer 13. The slicer 13 uses a threshold signal provided by the voltage regulator 14 to provide a digital signal to the output terminal 15.

The signal applied to the terminal 10 is also applied to the pulse-separating circuit 16. A timing signal generating circuit 17" produces a timing signal $S_{t3}$ which indicates the location in the signal $S_i$ of the portion of the signal immediately following the horizontal synchronizing pulse $H_{sync}$. The timing signal $S_{t3}$ is applied to a sample-and-hold circuit 25 as a sampling signal.

The output of the low-pass filter 12 is also provided to the sample-and-hold circuit 25. Using the timing signal $S_{t3}$, the sample-and-hold circuit 25 provides the level of the video signal immediately following the $H_{sync}$ pulse shown in FIG. 2. As shown in FIG. 2, that portion has different levels relative to the magnitude of $H_{sync}$ when a ghost signal is positive-phase ($p_1$), negative-phase ($p_2$) or not present at all. The held level is provided to the voltage regulator 14, which generates the threshold signal for the slicer 13. Because the sampled-and-held level of the video signal determines the change in the signal due to the ghost, that level can be used as a control signal to set the proper level for the threshold signal. The different levels of the threshold signal for the different signal conditions are shown in solid lines in FIG. 2A and in dot-dash lines in FIGS. 2B and 2C. The correct key code signal KC can then be generated as shown by the dot-dash lines in FIGS. 3B–3C.

It is of course possible to sample and hold a different portion of the video signal. For example, a portion of the first digital "1" bit of the key code can be sampled and held. It is also possible to use a reference level signal added to the video signal at a known location. If the reference signal has an amplitude with a known relation to that of a digital "1" bit of the key code, the proper threshold level can be provided.

In another modification, the average level of the signals making up the key code can be determined and the change therein used as an indication of the type of interference encountered. One way of determining that average level is the use of an integrating circuit which, in effect, determines the area under the waveforms shown in FIGS. 2A–2C.

Yet another possible approach in accordance with the present invention could provide a reference signal having an amplitude such that, when it is sampled and held, can be used directly as the threshold signal.

In the vertical blanking intervals of the video signal, the d.c. level of the signal can increase in the presence of a ghost signal when the intermediate frequency amplifier 3 includes automatic gain control. The resulting waveform of the video signal is called a "sag wave". FIG. 7A illustrates a vertical blanking interval of the video signal without a sag wave. As FIG. 7B shows, the digital key code in a signal with a sag wave cannot be detected with a threshold signal having the level shown in FIG. 7A.

FIG. 8 illustrates a circuit for adjusting the level of the threshold signal to enable proper detection of the key code in a video signal influenced by a sag wave. As FIG. 7B shows, when a sag wave is present, the horizontal synchronizing signals are not obtained from the pulse-separating circuit 16, and the apparatus shown in FIG. 8 uses that property of video signals influenced by sag waves to adjust the level of the threshold signal.

The first circuit path comprises the input terminal 10, the clamping circuit 11, the low-pass filter 12, the slicer 13, and the output terminal 15.

The video signal $S_i$ is also supplied to the pulse-separating circuit 16 which detects the horizontal synchronizing pulses $H_{sync}$. When a sag wave is present, the circuit 16 does not produce an output, which indicates the presence of a sag wave to a detector circuit 26. The output of the detector circuit 26 provides a control signal used to adjust the level of the threshold signal produced by the voltage regulator 14, as shown by the dot-dash line in FIG. 7B.

The circuit shown in FIG. 8 can also be used with the circuits shown in FIGS. 4–6 to increase the reliability of the reading apparatus. For example, in the embodiment shown in FIG. 4, the detector 26 can be connected between the output of the pulse-separating or sync-separating circuit 16 and the voltage regulator 14 in parallel with the timing signal generator 17 and the coincidence detector 18. With such a circuit the effect of a ghost signal on the key code and on the entire video signal is eliminated.

In the embodiments of the invention described above positive- and negative-phase ghost signals were used to illustrate the invention. However, those skilled in the art will recognize that the present invention can be used when ghosts in other phases are present, or when other types of interference are encountered.

Although several specific embodiments of the invention have been described in detail herein with reference to the accompanying drawings, it is to be understood that the invention is not limited to those embodiments, and that various changes and modifications can be effected therein by one skilled in the art without departing from the scope or spirit of the invention as defined in the appended claims.

What is claimed is:

1. A television receiver for unscrambling a broadcast video signal scrambled in a predetermined manner by using a digital key code broadcast with the video signal and having a predetermined value representative of the manner of scrambling the broadcast video signal, the receiver comprising:
    a key code reader for reproducing the predetermined value of the digital key code from the video signal which may be received by the receiver with an interference signal which changes a predetermined property of the broadcast signal and causes the levels of the received signal to change according to the change in the predetermined property thereby masking the broadcast key code, said key code leader including means for reading the received video signal by comparing levels thereof to the level of a threshold signal, sensing means for determining a change in said predetermined property and generating a control signal in response to said determining of a change, and threshold signal generating means for generating said threshold signal with said level of the threshold signal set in response to said control signal so that the key code read from the received video signal matches the broadcast key code;
    decoding means for producing from said reproduced key code a decoding signal; and
    unscrambling means for unscrambling the received video signal using said decoding signal; and wherein:
    the predetermined property of the broadcast signal includes the waveform of a portion of the broadcast signal containing the key code;
    said sensing means includes a comparing means for comparing the waveform of a corresponding portion of the received signal with a plurality of reference waveforms, each of which corresponds to a waveform produced by a known interference signal that may be superimposed on the broadcast signal, and generating said control signal with a value indicative of the particular reference waveform that matches the received waveform; and
    said level of said threshold signal is determined by the value of said control signal.

2. A digital code reading apparatus as in claim 1; wherein said key code is provided at a known location of the video signal in relation to a timing pulse therein and said sensing means further comprises:
    a pulse separator for detecting the timing pulse in the video signal;
    a timing signal generator for generating a timing signal in response to the output of said pulse separator, said timing signal being indicative of the known location in the video signal of the key code;
    pattern detector means for generating a pattern signal representative of the variations in the level of a portion of the video signal provided to said detector in response to said timing signal and providing said pattern signal to said comparing means; and
    memory means for providing to said comparing means a pluraility of reference signals each of which is representative of one of said reference waveforms.

3. A digital code reading apparatus as in claim 2; wherein the portion of the video signal provided to said pattern detector means comprises a digital "1" bit of the key code.

4. A digital code reading apparatus for reproducing digital information from a received scrambled video signal that was broadcast with at least two levels defining broadcast digital information and that may be received with an interference signal which changes a predetermined property of the broadcast signal and causes the levels of the received signal to change according to the change in the predetermined property thereby masking the broadcast digital information, said broadcast digital information comprising a key code indicative of a known condition of the broadcast signal and useable by a video receiver for unscrambling the broadcast signal, and wherein the predetermined property of the broadcast signal comprises a known difference between two the levels of the portion of the broadcast signal containing the key code, the reading apparatus comprising:
    means for reading the digital information in the received signal by comparing the levels of the received signal to the level of a threshold signal;
    sensing means for determining a change in said predetermined property of the broadcast signal and generating a control signal in response to said determining of a change, said sensing means including sampling means for sampling the level of a predetermined portion of the received signal and said control signal being the sampled portion of the received signal; and
    threshold signal generating means for generating said threshold signal with said level of the threshold signal set in response to said control signal so that the reproduced digital information matches the broadcast digital information.

5. A digital code reading apparatus as in claim 4; wherein the video signal includes a timing pulse having a known magnitude relative to the d.c. level of the signal and the interference signal changes the magnitude of the portion of the video signal just following the timing pulse by a known amount depending on the nature of the interference signal, and said sampled portion comprises said just-following portion.

6. A digital code reading apparatus as in claim 4; wherein the video signal includes a reference signal having a known magnitude relative to the d.c. level of the video signal and the interference signal changes the magnitude of the reference signal by a known amount depending on the nature of the interference signal, and said sampled portion comprises the received reference signal.

7. A digital code reading apparatus as in claim 6; wherein said magnitude of said reference signal has a predetermined value relative to the first digital "1" bit of the key code and said predetermined value is chosen so that said sampled portion has a level substantially the same as the level of said threshold signal required to reproduce the broadcast key code.

8. A television receiver for unscrambling a broadcast video signal scrambled in a predetermined manner by using a digital key code broadcast with the video signal and having a predetermined value representative of the manner of scrambling the broadcast video signal, the receiver comprising:

a key code reader for reproducing the predetermined value of the digital key code from the video signal which may be received by the receiver with an interference signal which changes a predetermined property of the broadcast signal and causes the levels of the received signal to change according to the change in the predetermined property thereby masking the broadcast key code, said key code reader including means for reading the received video signal by comparing levels thereof to the level of a threshold signal, sensing means for determining a change in said predetermined property and generating a control signal in response to said determining of a change, and threshold signal generating means for generating said threshold signal with said level of the threshold signal set in response to said control signal so that the key code read from the received video signal matches the broadcast key code;

decoding means for producing from said reproduced key code a decoding signal; and unscrambling means for unscrambling the received video signal using said decoding signal; and wherein:

the predetermined property of the braodcast signal comprises the d.c. level of the signal;

said sensing means includes a pulse separator for detecting timing pulses in the received signal and providing said control signal when said timing pulses are undetected due to the change in the d.c. level of the received signal; and said control signal changes said level of said threshold signal in accordance with the change in the d.c. level of the broadcast signal.

* * * * *